United States Patent [19]

Mitobe et al.

[11] 4,123,563

[45] Oct. 31, 1978

[54] PROCESS FOR THE PRODUCTION OF COLOR TELEVISION PICTURE TUBES

[75] Inventors: Koichi Mitobe, Chiba; Yasuhiko Uehara, Mobara, both of Japan

[73] Assignee: Hitachi, Ltd., Japan

[21] Appl. No.: 771,244

[22] Filed: Feb. 23, 1977

[51] Int. Cl.[2] .................. H01J 31/20; C03C 17/32; C03C 17/30

[52] U.S. Cl. .................. 427/68; 96/36.1; 427/64; 427/69; 427/123; 427/226; 427/385 A

[58] Field of Search .................. 427/64, 68, 69, 123, 427/226, 385 A; 96/36.1

[56] References Cited

U.S. PATENT DOCUMENTS

| | | | |
|---|---|---|---|
| 3,317,337 | 5/1967 | Saulnier | 427/69 |
| 3,582,390 | 6/1971 | Saulnier | 427/69 |
| 3,821,009 | 6/1974 | Lerner et al. | 427/64 |

*Primary Examiner*—John D. Smith
*Attorney, Agent, or Firm*—Craig & Antonelli

[57] ABSTRACT

In a process for the production of color television picture tubes which comprises at least the step of forming a phosphor layer on the inner surface of a panel, the step of coating said inner surface of the panel including said phosphor layer with an aqueous emulsion of a water-insoluble film-forming resin to form a volatilizable substrate layer, the step of forming a metal film on the substrate layer and the step of volatilizing the organic substances, a color television picture tube in which the blister or separation of the metal film can be prevented in said volatilization step and the undecomposed resin does not remain and which has an improved brightness can be produced by forming said substrate layer from at least two layers each of an emulsion, adding colloidal silica, an aqueous ammonium oxalate solution and aqueous hydrogen peroxide to the first layer emulsion, and adding polyvinyl alcohol-boric acid complex and a small amount of ammonium hydroxide to the emulsion of the layer contacting directly with said metal film.

1 Claim, 5 Drawing Figures

PROCESS FOR THE PRODUCTION OF COLOR TELEVISION PICTURE TUBES

The present invention relates to a process for the production of color television picture tubes. More particularly, the invention pertains to a process for the production of a fluorescent screen.

As shown in FIG. 1 in the accompanying drawings, a color television picture tube is made up mainly of a panel 4 having a skirt part 1 and a corner part 2 and having a phosphor layer 31 comprising phosphor picture elements 3 on its inner surface, a color selecting electrode such as a shadow mask, etc. arranged at a definite distance from the inner surface 41 of the panel 4, and an electron gun. The electron beams emitted from the electron gun are projected onto the phosphor layer 31 to produce an appointed color picture image. Also, in FIG. 1, the zone 5 wherein the phosphor layer 31 has been formed is the effective area of the panel.

On the inner surface 41 of said panel 4 is formed a metal backing 6 (hereinafter referred to as "metal film") which covers the whole phosphor layer 31. As shown in FIG. 2 in the accompanying drawings, the phosphor layer 31 is covered with an aqueous emulsion of an acrylic copolymer resin (a filming emulsion) and the resulting coating is heated and dried to form a volatilizable substrate layer 7. The metal film 6 is formed on the substrate layer 7 and the substrate layer is then volatilized. Thus, the metal film 6 is formed on the phosphor layer 31.

Usually, it is preferable that the filming emulsion for forming said substrate layer 7 is adapted to a change in the properties or composition of the phosphor layer 31. Also, the substrate layer must escape as a gas through said metal film 6 on baking and the escape of the gas must be conducted smoothly without causing the blister or movement of the metal film itself. The substrate layer formed on the side of the metal film 6 must be porous.

If blisters are produced in the metal film 6, the reflection of the light emitted from the phosphor layer 31 becomes non-uniform. Further, the metal film 6 is peeled, foreign metal particles are formed in the tube, and a spark discharge occurs between the electrodes. In order to obviate such a defect, therefore, there has heretofore been proposed a process, which does not cause blisters even if the resin content of the filming emulsion is increased, in, for example, Japanese Patent Kokoku (Post-Exam. Publn.) No. 24,416/72. According to this process, moderate porosity is afforded to the resin film or cracks and pores 8 as shown in FIG. 2 are selectively produced by adding polyvinyl alcohol-boric acid complex, a silicate, colloidal silica and aqueous hydrogen peroxide to the filming emulsion to increase the resin content of the filming emulsion by a definite amount. In such additives, the porosity of the metal film 6 can be regulated by aqueous hydrogen peroxide. Thereby, the occurrence of blisters in the metal film 6 on the phosphor layer 31 during volatilization step can be suppressed. Also, by the presence of the polyvinyl alcohol-boric acid complex and hydrogen peroxide, plurality of cracks and pores 8 are produced around or between phosphor picture elements 3 and the amount of the undecomposed resin can be decreased since oxygen necessary for the decomposition of the resin film in the volatilization step can be supplied.

Here, the present inventors have confirmed that the distribution of cracks and pores 8 varies according to a method for the coating of the phosphor or the shape of the phosphor picture elements 3 such as dot type or strip type together with the action of the above-mentioned polyvinyl alcohol-boric acid complex and aqueous hydrogen peroxide. Thus, it has been confirmed that, when the coating thickness $h_1$ of the phosphor layer 31 is small, cracks and pores 8 are produced at random rather than locally even if the amounts of the polyvinyl alcohol-boric acid complex and aqueous hydrogen peroxide are increased or decreased. It means that in a black matrix type color television picture tube having a thin phosphor layer 31 which is recently becoming increasingly popular, the space between a black matrix film 9 and a metal film 6 becomes narrow as shown in FIG. 3 in the accompanying drawings and cracks and pores 8 can not be produced locally. When the cracks and pores 8 are not thus produced locally, the cracks and pores 8 are produced even just above the phosphor picture elements 3 as shown in FIG. 3. Thereby, the light reflectivity of the metal film 6 is reduced and metal particles penetrate into the phosphor picture elements through the cracks 8 in the metal backing step and the phosphor picture elements 3 are contaminated. Thus, the luminous efficiency of the phosphor picture elements 3 is reduced.

On the other hand, there is two-layer filming process disclosed in U.S. Pat. No. 3,317,337 as a process which has solved the above-mentioned problems. In this process, in order to decrease the amount of the residue due to a filming emulsion containing additives which is poor in thermal decomposition action and prevent the contamination of the phosphor picture elements 3 by metal particles in the metal backing step and the movement and blister of the metal film 6 in the volatilization step, the substrate layer 10 consisting of a resin film which has flexibility and is free of cracks and pores is first formed as the first layer and a substrate layer 11 of a comparatively hard and porous resin film is formed as the second layer as shown in FIG. 4. According to such a process, the metal film 6 is evaporated on the second substrate layer 11 of the resin film. Therefore, a porous metal film 6 is formed as the replica of the second layer, and it is effective for preventing the blister of the metal film 6 in the volatilization step.

However, the following problem arises in the above-mentioned two-layer filming process. The surface of curvature at the panel skirt part 1, panel corner 2, etc. other than the effective area 5 of the panel is a glass surface, which is little in surface roughness at the inner surface of the panel. When a filming agent is directly coated thereonto to form the first substrate layer 10, a filming emulsion is then coated thereonto to form the second substrate layer 11, and the thus formed substrate layer is coated with a metal backing, therefore, blisters are produced at the metal film 6 in the volatilization step.

Therefore, an object of the present invention is to provide a process for the production of a color television picture tube having a metal film wherein no blister occurs in the volatilization step.

Another object of the invention is to provide a process for the production of a color television picture tube wherein the defects of prior art processes have been obviated.

These and other objects and advantages of the invention will be apparent by referring to the following description and claims, taken in conjunction with the accompanying drawings in which:

According to the present invention, there is provided a process for the production of color television picture tubes which comprises at least the step of forming a phosphor layer on the inner surface of a panel, the step of coating said inner surface of the panel including said phosphor layer with an aqueous emulsion of a water-insoluble film-forming resin to form a volatilizable substrate layer, the step of forming a metal film on the substrate layer and the step of volatilizing the organic substances, characterized by forming said substrate layer from at least two layers each of an emulsion, adding colloidal silica, an aqueous ammonium oxalate solution and aqueous hydrogen peroxide to the first layer emulsion, and adding polyvinyl alcohol-boric acid complex and a small amount of ammonium hydroxide to the emulsions of the layer contacting directly with said metal film.

It has been found that the reason why blisters are produced in the above-mentioned two-layer filming process is that the inner surface 41 and the metal film 6 are completely separated from each other since any effective anchoring agent is not contained in the substrate layer 10 consisting of the filming emulsion of the first layer coating the less uneven surface of the panel completely.

Therefore, the present inventors have found that the blister and separation of the metal film 6 can be prevented by adding 0.1 to 3.0% by weight of colloidal silica as an anchoring agent to the filming emulsion of the first layer as the first method.

Figure 1:
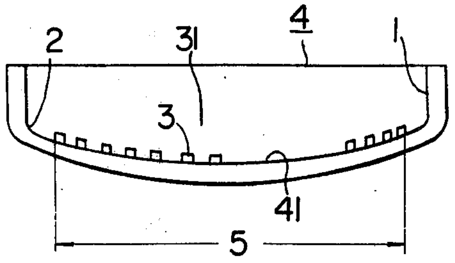
FIG. 1 is a sectional view showing the structure of a color television picture tube, and particularly the inner surface of its faceplate.
Figure 2:
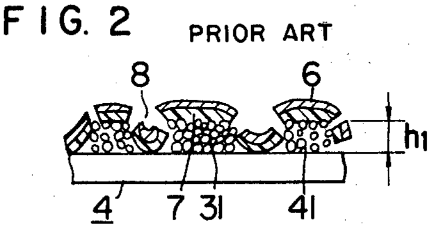
FIG. 2 PRIOR ART
FIGS. 2–4 are sectional views for illustrating a process for the production of a color television picture tube which has heretofore been proposed.
Figure 3:
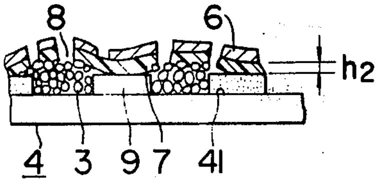
FIG. 3 PRIOR ART
Figure 4:
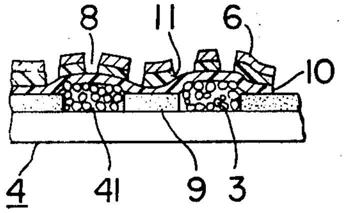
FIG. 4 PRIOR ART
Figure 5:
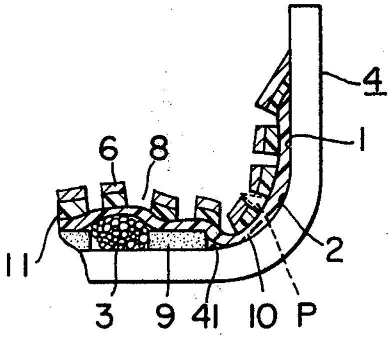
FIG. 5 is a sectional view for illustrating a process for the production of a color television picture tube according to the present invention.

Also, the present inventors have found that it is more effective for the prevention of the blister to add 0.05 to 1.00% by weight of an aqueous ammonium oxalate solution (concentration 2.5% by weight) to said filming emulsion of the first layer as the second method. In the step of forming the first layer, ammonium oxalate is recrystallized to form needle crystals P, which produces pores in the metal film 6 in the metal backing step as shown in FIG. 5. Ammonium oxalate itself is decomposed at 180° C., which is lower than the volatilization temperature (350° C.) of the filming resin of the second layer, in the next volatilization step. Therefore, the volatilization of the film resin can be completed without causing blister due to a difference in volatilization speed.

Each of the first and second methods can produce alone a definite effect, but even a combination thereof can produce the effect.

The surface of curvature at the panel skirt part 1 and the panel corner 2 other than the effective area of the panel is extermely few in the amount of cracks and pores 8 as compared with the effective area 5 of the panel since the ground of a glass surface free of unevenness is directly coated by the filming resins of the first layer and the second layer. Also, the supply of oxygen for decomposing the resin is restricted and the undecomposed resin turns brown. On viewing through the panel there arises a problem of appearance.

The present inventors have confirmed that it is effective as a countermeasure therefor to add 0.5 to 1.0% by weight of aqueous hydrogen peroxide (concentration 35% by weight) to the filming emulsion of the first layer and to increase pores 8 produced by the above-mentioned needle crystals P of ammonium oxalate.

Further, it has been confirmed that it is effective for increasing aluminum smoothness and improving coating property by adjusting the pH of the emulsion to 7.0 to add 0.5 to 5.0% by weight of polyvinyl alcohol-boric acid complex and a small amount of ammonium hydroxide to the filming emulsion of the layer contacting directly with the metal film 6.

According to the process of the present invention, a color television picture tube wherein the blister or separation of a metal film in the volatilization step can be prevented, the undecomposed resin does not remain, and its brightness have been improved can be produced.

The following examples illustrate the present invention in more detail.

EXAMPLE 1

A green phosphor slurry consisting of 30 parts by weight of a green phosphor, 2.5 parts by weight of polyvinyl alcohol, 0.2 part by weight of potassium bichromate, 0.05 part by weight of a surface active agent and 67.25 parts by weight of pure water is coated onto the inner surface of a faceplate by rotary coating method, heated by a heater and dried. A shadow mask is installed and the thus formed coating is exposed to light from a 2500 1× extra-high pressure mercury lamp through the shadow mask for 60 seconds and developed by spraying with warm water to obtain a green phosphor picture element. Then, blue and red phosphor picture elements are formed in the same manner. The phosphor layer is coated with a filming emulsion consisting of 8.8 parts by weight of a 34% by weight copolymer of n-butyl methacrylate and methacrylic acid, 1.7 parts by weight of 30% by weight colloidal silica, 20.0 parts by weight of a 2.5% by weight aqueous ammonium oxalate solution, 1.4 parts by weight of 35% by weight aqueous hydrogen peroxide and 68.1 parts by weight of pure water, heated by a heater and dried to form a resin film as the first layer. Another filming emulsion consisting of 38.7 parts by weight of a 38% by weight acrylic resin Primal B74 (an aqueous emulsion of an acrylic resin manufactured by Rohm & Haas Co., U.S.A.), 30.0 parts by weight of a 2% by weight polyvinyl alcohol-boric acid complex, a small amount of ammonium hydroxide, 2.0 parts by weight of 100% by weight glycerol and 29.3 parts by weight of pure water is then coated and dried to form a resin film as the second layer. Aluminum is evaporated thereon to form a metal film and the organic substances are volatilized by bakeout.

The fluorescent screen thus produced is very good in that the blister or separation of the metal film 6 does not occur on the surface of curvature of the effective area 5 of the panel, the panel skirt part 1 and the panel corner 2 and the undecomposed resin which has turned brown does not remain. When a color television picture tube is assembled by the use of the fluorescent screen and a color picture image is produced, the brightness of the image is about 5% higher than that in prior art color television picture tubes.

EXAMPLE 2

A fluorescent screen is produced in the same manner as an Example 1 except that an emulsion consisting of 17.6 parts by weight of a 34% by weight copolymer of n-butyl methacrylate and methacrylic acid, 0.8 part by weight of 30% by weight colloidal silica, 20.0 parts by weight of a 2.5% by weight aqueous ammonium oxalate solution, 0.7 part by weight of 35% by weight aqueous hydrogen peroxide and 60.9 parts by weight of pure water is used as the first layer filming emulsion and an emulsion consisting of 38.7 parts by weight of a 38% by weight acrylic resin Primal B 74, 30.0 parts by weight of a 2% by weight polyvinyl alcohol-boric acid complex, a small amount of ammonium hydroxide, 0.8 part by weight of 30% by weight colloidal silica, 0.7 part by weight of 35% by weight aqueous hydrogen peroxide and 29.8 parts by weight of pure water is used as the second layer filming emulsion. The fluorescent screen thus produced is similarly excellent to that obtained in Example 1.

EXAMPLE 3

A fluorescent screen is produced in the same manner as in Example 1 except that an emulsion consisting of 26.5 parts by weight of a 34% by weight copolymer of n-butyl methacrylate and methacrylic acid, 8.3 parts by weight of 30% by weight colloidal silica, 44.0 parts by weight of a 2.5% by weight aqueous ammonium oxalate solution, 2.9 parts by weight of 35% by weight aqueous hydrogen peroxide and 18.3 parts by weight of pure water is used as the first layer filming emulsion. The fluorescent screen thus produced is similarly excellent to that obtained in Example 1.

Thus, the present invention is an improvement in the process as disclosed in U.S. Pat. No. 3,317,337, which is an invention useful for the mass production of color television picture tubes.

Also, the acrylic resin used in the filming emulsion of the first layer in Examples 1 to 3 is not limited to the copolymer of n-butyl methacrylate and methacrylic acid, but any of the resins as proposed in U.S. Pat. No. 3,317,337 can be employed. What is claimed is:

1. In a process for the production of color television picture tubes which comprises at least the step of forming a phosphor layer on the inner surface of a panel, the step of coating said inner surface of the panel including said phosphor layer with an aqueous emulsion of a water-insoluble film-forming resin to form a volatilizable substrate layer, the step of forming a metal film on the substrate layer and the step of volatilizing the organic substances, the improvement characterized by forming said substrate layer from at least two layers each of an emulsion, drying the resulting respective film coatings of emulsion after formation thereof, adding 0.1 to 3.0% by weight colloidal silica, 0.05 to 1.00% by weight of an aqueous ammonium oxalate solution (concentration 25% by weight) and 0.5 to 1.0% by weight aqueous hydrogen peroxide (concentration 35% by weight) to the first layer emulsion, and adding 0.5 to 5.0% by weight polyvinyl alcohol-boric acid complex and a small amount of ammonium hydroxide to the emulsion of the layer contacting directly with said metal film.

* * * * *